United States Patent [19]

Dobkin

[11] 4,353,025
[45] Oct. 5, 1982

[54] PHASE CONTROLLED VOLTAGE REDUCING CIRCUIT HAVING LINE VOLTAGE COMPENSATION

[75] Inventor: Robert C. Dobkin, Hillsborough, Calif.

[73] Assignee: Hybrinetics, Inc., Santa Rosa, Calif.

[21] Appl. No.: 214,011

[22] Filed: Dec. 8, 1980

[51] Int. Cl.³ .................................................. G05F 5/00
[52] U.S. Cl. .............................. 323/300; 307/252 B; 323/324
[58] Field of Search ............... 323/239, 324, 325, 300; 307/252 B, 252 N, 252 T

[56] References Cited

U.S. PATENT DOCUMENTS 3,319,077  5/1967  Morris ............................ 307/252 N
4,031,458  6/1977  Ichikawa ............................. 323/324

FOREIGN PATENT DOCUMENTS 1546899 10/1968 France .............................. 307/252 B Primary Examiner—William H. Beha, Jr.
Attorney, Agent, or Firm—Flehr, Hohbach, Test, Albritton & Herbert

[57] ABSTRACT

A voltage reducing circuit device for reducing the RMS value of an incoming AC voltage is disclosed herein. This device is especially suitable for reducing line voltage applied to a load requiring lower voltage. In a preferred embodiment, the device is one which allows a domestic made 115 VAC small heating apparatus, such as a hair dryer, to be used in foreign countries where the 230 VAC service is available. In any case, the device is one which is relatively insensitive to fluctuations in line voltage and to changes in frequency.

10 Claims, 7 Drawing Figures

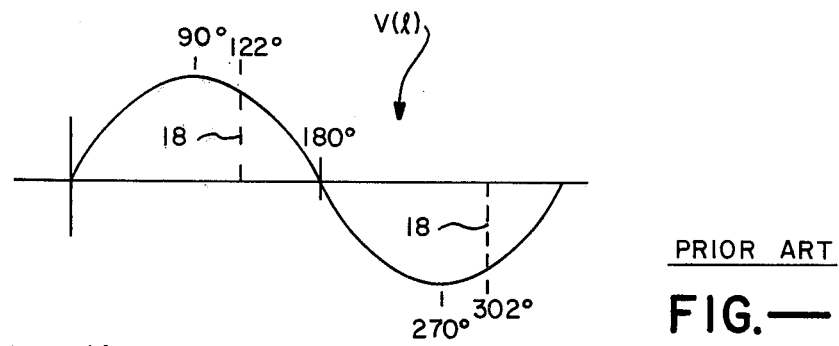
PRIOR ART
FIG.—1
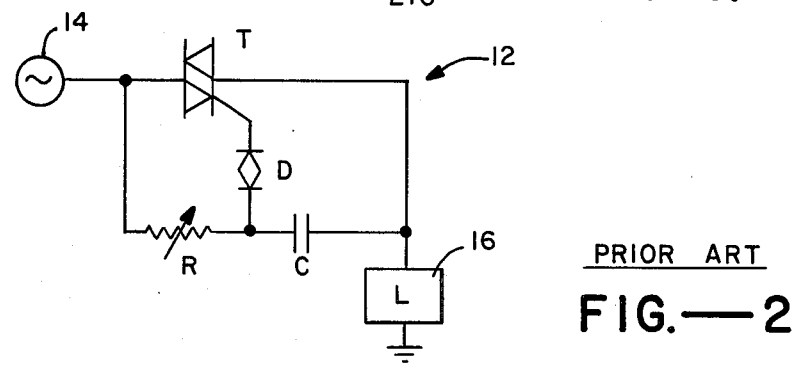
PRIOR ART
FIG.—2
FIG.—4
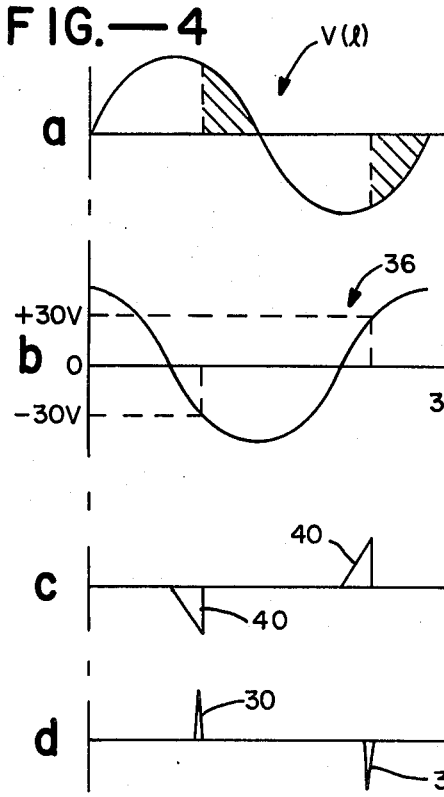
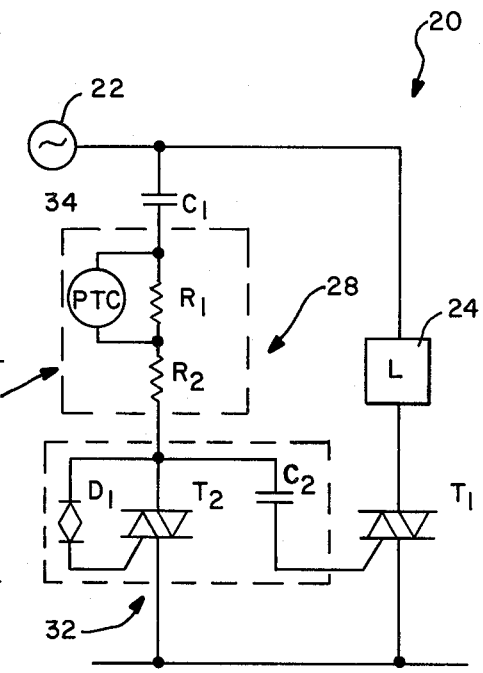
FIG.—3

PHASE CONTROLLED VOLTAGE REDUCING CIRCUIT HAVING LINE VOLTAGE COMPENSATION

The present invention relates generally to a circuit device for reducing the amount of incoming AC line voltage which is applied to a given load and more particularly to a voltage reducing device which is relatively insensitive to fluctuations in line voltage amplitude and frequency and which is especially suitable for reducing by a predetermined amount the RMS value of the incoming AC line voltage applied to a heating appliance.

A device of the general type just recited is currently available for modifying domestically made small heating appliances such as hair dryers (that is, those made for operation on 115 volt AC) to be used in a foreign country where only 230 VAC voltage is available. This currently available prior art device which will be described below in conjunction with FIGS. 1 and 2 of the present specification has a number of drawbacks. First, the device is extremely sensitive to variation in the amplitude and frequency of its incoming line voltage and therefore does not reliably provide a constant voltage reduction. Second, each device requires fine tuning using a variable resistor which is time consuming and therefore expensive. The primary reason for each of these drawbacks resides in the utilization of an RC timing circuit which is responsible for controlling the amount of line voltage actually applied to the load, as will be discussed below.

Referring to FIG. 1, a single cycle of AC line voltage having a sinusoidal wave form is shown. This voltage which is generally indicated at V(1) has a root means square (RMS) or effective value of 230 VAC in a preferred embodiment, specifically the service voltage available in many foreign countries. In order to use this higher voltage service on a small heating apparatus such as a hair dryer which is domestically made to operate on 115 VAC (RMS), a prior art device of the general type illustrated in FIG. 2 has been made available. This device is generally indicated at 12 and includes as its primary components a triac T, a diac D and the previously mentioned RC circuit consisting of capacitor C and variable resistor R. As illustrated in FIG. 1, the triac is connected on one side to the incoming voltage as indicated by the source at 14 and on its other side to a heating apparatus or other such load indicated generally at 16. The capacitor C and variable resistor R are connected across the triac between source 14 and load 16 as shown. Diac D is connected on one side between the capacitor and variable resistor and on its other side to the gate of the triac T. Device 12 may include other components which are not necessary to an understanding of the operation of the device and the previously recited drawbacks and, hence, these other components will not be described herein.

Having described the important circuitry making up prior art device 12, attention is now directed to the way in which it operates to reduce the amount of line voltage V(1) applied to load 16, assuming first that its amplitude and frequency are both stable. Let it also be assumed that the line voltage is initially applied to the device at the beginning of the cycle illustrated in FIG. 1. Under these circumstances, both the triac T and diac D are non-conductive. Therefore, as the amplitude of the incoming line voltage increases during its first half cycle, a proportionately increasing voltage appears across the resistor R on one side of the diac. The diac is a device which will conduct upon application of a voltage of predetermined amplitude, specifically about 30 volts. The values of resistor R and capacitor C are selected to form an RC timing network which provides this threshold voltage at a fixed point in time during each half cycle of line voltage. In the case where the incoming line voltage is 230 VAC (RMS) and 115 VAC (RMS) to the load is desired, the RC timing network is designed to break down the diac D at approximately 122 degrees into each half cycle, as indicated by the dotted lines 18 in FIG. 1. Once the diac breaks down and conducts, the capacitor C discharges through the diac and into the gate of triac T, thereby serving as a trigger pulse for causing the triac to go from its non-conductive state to its conductive state. This in turn causes the remainder of that particular half cycle to be applied to the load such that in any cycle the effective voltage applied to the load is 115 volts.

So long as the amplitude and frequency of the line voltage remain fixed and the values of the resistor R and capacitors C are properly selected, the desired amount of voltage will be applied to the load, specifically 115 volts RMS. However, the line voltage is not always stable with respect to amplitude and/or frequency and both capacitors and resistors are manufactured with relatively large tolerances, at least with respect to the close tolerances required for a circuit device of the present type. If either the amplitude of frequency varies, the point in time at which the diac breaks down and conducts during any given half cycle will also vary, thereby resulting in a varied amount of line voltage passing to the load. Moreover, in the case of amplitude, this variation is significantly greater than the increase or decrease in line voltage. This is because the amplitude variation is not only reflected in the actual voltage applied to the load (for example as an increase or decrease of 5 volts) but because the amplitude variation changes significantly the time the diac breaks down during the given half cycle of line voltage as stated above. This, in turn, further changes the RMS value applied to the load, thereby further contributing to the error. In the case of frequency variations, even small variations, the configuration of each half cycle of line voltage affected will change, thereby resulting in a significant change in conduction timing of the diac and therefore the triac during the half cycle which, in turn, changes significantly the amount of power applied to the load. With respect to the timing network itself, the sensitivity to manufacturing tolerances of the capacitor C and resistor R can be minimized by providing a variable resistor and fine tuning each device 12 by fine tuning the resistor. However, the use of a variable resistor is more expensive than a fixed resistor and the necessity to provide this fine tuning is time consuming and therefore expensive, as is stated above.

In view of the foregoing, one object of the present invention is to provide a voltage reducing device of the general type described above but one which is significantly less sensitive to variations in line voltage and frequency and yet a device which is uncomplicated in design, economical to provide and reliable to use.

Another object of the present invention is to provide a voltage reducing device of the general type described but one which does not require a variable resistor or any other fine tuning arrangement.

A more specific object of the present invention is to provide a voltage reducing device of the general type described but one which does not rely on an RC timing network or any other type of timing network to provide the desired reduction in applied line voltage.

Another specific object of the present invention is to provide a voltage reducing device of the last mentioned type which is especially suitable for reducing the RMS value of a 230 VAC line voltage to 115 volts RMS.

As will be seen hereinafter, the circuit device disclosed herein is one which includes an externally controllable switching means, for example a triac, operable between a conductive state for electrically connecting the given load, for example a small heating apparatus such as a hair dryer, with the line voltage and a non-conductive state for electrically disconnecting the load from the line voltage. In accordance with the present invention, the device also includes a control circuit designed to control the conductive and non-conductive period of each half cycle of line voltage without using a timing network, as stated above. Instead, the control circuit disclosed herein includes means responsive to the line voltage for producing an AC control voltage or current which leads the line voltage by approximately 90 degrees and control means connected with the switching means and responsive to only the amplitude of the control voltage during each half cycle of the line voltage for determining the period during each of these half cycles that the switching means is conductive whereby to controllably reduce the amount of AC line voltage applied to the load by a predetermined amount.

The circuit device disclosed herein and its various features will be described in more detail in conjunction with the drawings wherein:

FIG. 1 which was described previously is a diagrammatic illustration of one cycle of sinusoidal AC line voltage;

FIG. 2, which was also described previously, is a diagrammatic illustration of a prior art device for reducing by a predetermined amount the RMS value of an incoming AC line voltage applied to a given load;

FIG. 3 schematically illustrates a voltage reducing device which serves the same purpose as the device illustrated in FIG. 2 but one which is designed in accordance with the present invention;

FIG. 4a diagrammatically illustrates a sinusoidal line voltage similar to the one shown in FIG. 1, but used with the device of FIG. 3;

FIG. 4b diagrammatically illustrates a control voltage or current also used by the device of FIG. 3 and one which corresponds in amplitude and frequency to the line voltage of FIG. 4a, but which leads the line voltage by 90 degrees;

FIG. 4c diagrammatically illustrates a pair of secondary trigger signals used by the circuit device of FIG. 3 for its operation; and FIG. 4d diagrammatically illustrates two primary trigger signals provided by and used for the device illustrated in FIG. 3 in its operation.

Turning now to the drawing, since FIGS. 1 and 2 have already been described previously, attention is immediately directed to FIGS. 3 and 4. Referring specifically to FIG. 3, a circuit device 20 for reducing by a predetermined amount the RMS value of an incoming AC line voltage V(1) (FIG. 4a) from a source 22 applied to a given load 24 is disclosed there. In an actual working embodiment, the load is a small heating apparatus, specifically a hair dryer or the like, and the line voltage is 230 VAC (RMS), specifically the standard voltage service in many foreign countries. Device 20 will be described with regard to this specific embodiment and, hence, will be shown to reduce the incoming AC line voltage applied to load 24 to a value of 115 volts RMS. However, it should be understood that by modifying the values of the components making up circuit 20, the latter could be readily modified to reduce the incoming AC line voltage applied to its load by any desired amount. In any event, as will also be seen, device 20 provides the desired reduction in a way which is significantly less sensitive to amplitude and frequency fluctuations in line voltage and requires no fine tuning.

As illustrated in FIG. 3, device 20 includes a triac $T_1$ connected in series with load 24, both of which are connected between the voltage source 22 and ground. Triac $T_1$ operates the same way as triac T, that is, during a given half cycle of line voltage it will conduct only in response to the application of a trigger signal of predetermined amplitude to its gate and will remain in the conductive state throughout the rest of the half cycle, that is, until the applied voltage goes to zero. In order for the triac to again conduct during the next half cycle, a new trigger signal must be applied to its gate.

Circuit device 20 also includes an overall control circuit 28 which serves to produce the trigger signals referred to immediately above and apply the latter to the gate of triac $T_1$. Moreover, these trigger signals which are generally indicated at 30 in FIG. 4d are applied precisely at the right time during each given half cycle to control the state of conduction of triac $T_1$ such that the desired amount of voltage from source 22 is applied to load 24.

Referring to control circuit 28, the latter is shown including a capacitor $C_1$, a current limiting resistance 31 (in the dotted box) and an amplitude sensitive trigger signal control arrangement 32 (within the second dotted box). The current limiting resistance is formed from two fixed resistors $R_1$ and $R_2$ and a temperature sensitive resistant device, specifically a thermistor (PTC), generally indicated at 34. The PTC device is mounted in close proximity physically to the triac $T_1$. The control arrangement 32 is formed from a second triac $T_2$, a second capacitor $C_2$ and a diac $D_1$. The various components making up control circuit 28 are interconnected to one another and to the rest of the components making up device 20 in the manner illustrated in FIG. 3.

Capacitor $C_1$ is provided for responding to the line voltage V(1) in order to produce therefrom an AC control current generally indicated at 36 in FIG. 4b. The capacitor is made sufficiently large to cause the control current to lead the line voltage by about 90 degrees, as seen in FIGS. 4a and 4b. In theory, it would be desirable to make control current 36 lead line voltage V(1) by exactly 90 degrees. In practice, however, the capacitor $C_1$, which is responsible for providing the phase shift, is not always capable of accomplishing this. Nevertheless, if the capacitor is made large enough, for example, 0.18 microfarads as in the actual embodiment, the control current will reliably lead the line voltage by about 85 to 90 degrees which is satisfactory for the present invention. In this regard, it should be noted that the capacitor itself can never cause the control current (or voltage in the case of an open circuit) to lead the line voltage by more than 90 degrees. Also, the capacitor $C_2$ is made sufficiently small (for example, 0.01 microfarads as in the actual embodiment) so as not to effect the phase leading capabilities of capacitor $C_1$.

The current limiting resistance 31 serves to prevent undesirably high currents to be applied to control arrangement 32 which might typically occur during transient conditions or initial turn-on. As stated previously, arrangement 30 is comprised of resistors $R_1$ and $R_2$ and the heat sensitive PTC device 34. In an actual working embodiment, resistor $R_1$ is quite large, specifically 7K ohms, and the resistor $R_2$ is relatively small, specifically 1K ohms. At the same time, during normal operating conditions when the load is running properly, the resistance provided by the PTC device is quite low, specifically on the order of 50 ohms. As a result, the larger resistor $R_1$ is bypassed so that under normal operating conditions the current limiting resistance is approximately equal to the sum of resistor $R_1$ and the PTC. This total resistance is selected to provide normal operation of the device 20 in the manner to be described. However, should there be an overload, an increase in temperature will result at $T_1$ and will be sensed by the PTC device which, as stated previously, is physically located in close proximity to $T_1$, and will increase significantly in resistance, specifically on the order of 50,000 ohms or more. This will decrease significantly the current applied to the control arrangement 32 which, in turn, will reduce significantly the power which is applied to the load.

Assuming normal operation of device 20, control arrangement 32 is responsive to and operated on by the control current 36 which is set in amplitude to a predetermined value determined by the current limiting resistance 31 and $C_1$. In order to more clearly understand how the control arrangement provides previously described trigger signals 30 at the appropriate time, it will also be assumed that the starting point is the beginning of one cycle of line voltage V(1). At that time, the control voltage is at its positive peak value, the triac $T_1$ is non-conductive and the triac $T_2$ is conductive. This latter component remains conductive until the control current crosses zero during the first half cycle of the line voltage at which time triac $T_2$ becomes non-conductive. Thereafter, as the first half cycle of the line voltage continues, the absolute value of the control voltage (as opposed to current since $T_2$ is open, e.g., non-conductive) increases. At the same time, since the triac $T_2$ is non-conductive, the capacitor $C_2$ charges. When the amplitude of the control voltage reaches a predetermined absolute level (on the negative side), specifically 30 volts in an actual embodiment, the diac $D_1$ conducts producing a secondary trigger signal to the gate of triac $T_2$ as indicated at 40 in FIG. 4c. This trigger signal causes the triac $T_2$ to conduct resulting in the discharge of capacitor $C_2$ into the gate of triac $T_1$ in the form of previously recited trigger signal 30. This latter trigger signal in turn causes the triac $T_1$ to conduct for applying the rest of the corresponding half cycle of line voltage to the load. From FIGS. 4a to 4d, it should be apparent that the point at which the diac is made to conduct (and therefore that the time that the triac $T_2$ conducts) is a predetermined point along the amplitude of the control signal after the latter crosses zero. This point which is itself amplitude dependent, in turn, corresponds to the predetermined firing point of triac $T_1$ on the first half cycle of line voltage, specifically at the 122 degree point along the first half cycle in an actual embodiment.

At the beginning of the next half cycle of line voltage, the triac $T_1$ turns off since the line voltage crosses zero. However, the triac $T_2$ remains conductive. Thereafter, the control voltage again crosses zero, causing the triac $T_2$ and diac $D_1$ to become non-conductive and the capacitor $C_2$ begins to recharge. When the control voltage reaches the same absolute predetermined value (on the positive side), the diac again conducts, resulting in a second triggering pulse 40 and therefore a second primary triggering signal 30 which again causes the triac $T_1$ to conduct for connecting the line voltage to the load at the appropriate time. This is continuously repeated through each half cycle of the line voltage and control voltage.

It should be apparent from the foregoing that device 20 is responsive only to the amplitude of the control voltage which leds its line voltage by approximately 90 degrees in controlling the amount of voltage applied to load 24. There is no timing network involved and therefore should there be a fluctuation in amplitude of line voltage 22, the only significant difference between the voltage actually applied to the load and the desired voltage to be applied is the variation between what the line voltage should be and what it actually is. The point along the line voltage at which the triac $T_1$ conducts will not change appreciably, that is, it will remain at about 122 degrees along each half cycle, although a slight shift forward or backwards might occur as a result of line voltage fluctuations. This is equally true for changes in frequency. However, these shifts are small and insignificant as compared to the shifts which occur using the previously described timing circuit for similar fluctuations.

What is claimed is:

1. A circuit device for reducing by a predetermined amount the RMS value of an incoming AC line voltage applied to a given load, said device comprising:
   (a) externally controllable switching means operable between a conductive state for electrically connecting said given load with said line voltage and a non-conductive state for electrically disconnecting said load from said line voltage; and
   (b) a control circuit including
      (i) means responsive to said line voltage for producing an AC control voltage and associated control current which leads said line voltage by about 90 degrees, and
      (ii) control means free of any RC timing circuitry connected with said switching means and responsive to the amplitude of said control current during each half cycle of said line voltage for determining directly from said control voltage and associated current the period during each of said half cycles that said switching means is in said conductive state without resorting to RC timing circuitry, whereby to controllably reduce the amount of said AC line voltage applied to said load by said predetermined amount while minimizing fluctuations in said predetermined amount as a result of fluctuations in the amplitude and/or frequency of said line voltage.

2. A circuit device according to claim 1 wherein said switching means once initiated into operation in said conductive state during any given half cycle of said line voltage remains in said conductive state only during the remainder of said given half cycle and wherein said control means includes means for initiating said switching means into its conductive state during each given half cycle of said line voltage when the amplitude of said control voltage reaches a predetermined level during a corresponding half cycle of the latter.

3. A circuit device according to claim 2 wherein said switching means consists of a triac including a control gate adapted to receive a primary trigger signal for placing said triac in its conductive state and wherein said initiating means is connected with and applies a trigger signal to said gate when the amplitude of each half cycle of said control voltage initially reaches a predetermined level.

4. A circuit according to claim 1 wherein said control circuit includes current limiting means for protecting said control means from abnormally high current passing thereto.

5. A circuit according to claim 4 wherein said current limiting means includes a current limiting resistance including a heat sensitive means adapted for positioning in close proximity to said switching means, said heat sensitive means causing said resistance to increase in resistance with heat from said load over a given range.

6. A circuit device for reducing by a predetermined amount the RMS value of an incoming AC line voltage applied to a given load, said device comprising:

(a) a load circuit including a triac having a control gate and adapted for connection with said line voltage and said load, said triac being operable between a conductive state for electrically connecting said load with said line voltage during each half cycle of said line voltage after application of a predetermined trigger signal to said control gate during each half cycle and a non-conductive state for maintaining said load electrically disconnected from said line voltage during each half cycle prior to application of said trigger signal; and (b) a control circuit connected with and responsive to said line voltage for providing said trigger signal, said control circuit including:

(i) a capacitor responsive to said line voltage for providing an AC control voltage and associated control current therefrom, said capacitor being efficiently large to cause said control current to lead said line voltage by about 90 degrees, and (ii) control means free of any RC timing circuitry connected with the gate of said triac and with said capacitor and being responsive to an initial predetermined amplitude of said control voltage during each half cycle of said control voltage for producing said trigger signal each control voltage half cycle directly from said control voltage and associated current and applying said signal to the gate of said triac without resorting to RC timing circuitry, whereby the amplitude of said control voltage is used to control the amount of AC line voltage which is applied to said load while minimizing fluctuations in the amount of line voltage applied to said load as a result of fluctuations in the amplitude and/or frequency of said line voltage.

7. A circuit device according to claim 6 wherein said AC line voltage is a sinusoidal voltage having a peak amplitude of about 230 volts and a frequency of between about 50 and 60 Hz and wherein said predetermined amplitude of said control voltage is selected such that the RMS value of the incoming AC line voltage being applied to said load during any given cycle is about 115 volts.

8. A circuit device for reducing by a predetermined amount the RMS value of an incoming AC line voltage applied to a given load, said device comprising:

(a) a load circuit including a triac having a control gate and adapted for connection with said line voltage and said load, said triac being operable between a conductive state for electrically connecting said load with said line voltage during each half cycle of said line voltage after application of a predetermined trigger signal to said control gate during each half cycle and a non-conductive state for maintaining said load electrically disconnected from said line voltage during each half cycle prior to application of said trigger signal;

(b) a control circuit connected with and responsive to said line voltage for providing said trigger signal, said control circuit including:

(i) a capacitor responsive to said line voltage for providing an AC control voltage and associated control current therefrom, said capacitor being efficiently large to cause said control current to lead said line voltage by about 90 degrees, and (ii) control means connected with the gate of said triac and with said capacitor and being responsive to an initial predetermined amplitude of said control during each half cycle of said control voltage for producing said trigger signal each control voltage half cycle and applying said signal to the gate of said triac whereby the amplitude of said control signal is used to control the amount of AC line voltage which is applied to said load; and (c) said control means including a second triac having a gate and electrically connected in series with said capacitor, a second capacitor having one side electrically connected between said first-mentioned capacitor and second triac and its opposite side connected to the gate of said first-mentioned triac whereby when said second triac is non-conductive a charge develops said second capacitor and when said second triac is thereafter made conductive, said charged capacitor discharges to its connected gate in the form of said trigger signal, said second capacitor being sufficiently small so as not to affect the phase relationship between said lines and control voltages, and a diac having one side connected between said first-mentioned capacitor and said second triac and an opposite side connected to the gate of said second triac, said diac being responsive to said predetermined amplitude of said control voltage each half cycle for producing a secondary trigger signal and applying the latter to the second triac gate for causing the latter to operate in its conductive state during the remainder of the half cycle.

9. A circuit device according to claim 8 wherein said control circuit includes current limiting means for protecting said control means from abnormally high current passing thereto, said second limiting means including a first fixed resistor and a second large fixed resistor in series with another and with one said first-mentioned capacitor and said control means and a heat sensitive variable resistor connected in parallel with said large resistor, said variable resistor being adapted for physical location in close proximity to said load whereby to increase in value with increase in the heat from said load.

10. A circuit device for reducing by a predetermined amount the RMS value of an incoming AC line voltage applied to a given load, said device comprising:

(a) externally controllable switching means operable between a conductive state for electrically connecting said given load with said line voltage and a non-conductive state for electrically disconnecting said load from said line voltage;

(b) a control circuit including
   (i) means responsive to said line voltage for producing an AC control voltage and associated control current which leads said line voltage by about 90 degrees, and
   (ii) control means connected with said switching means and responsive to the amplitude of said control current during each half cycle of said line voltage for determining the period during each of said half cycles that said switching means is in said conductive state, whereby to controllably reduce the amount of said AC line voltage applied to said load by said predetermined amount; and (c) said switching means consisting of a triac including a control gate adapted to receive a primary trigger signal for placing said triac in its conductive state, said initiating means being connected with and applying a trigger signal to said gate when the amplitude of each half cycle of said control voltage initially reaches a predetermined level; said initiating means including a second triac having a control gate adapted to receive a secondary trigger signal and a capacitor for providing the primary trigger signal when said secondary trigger signal is applied to the gate of said second triac, and said initiating means also including a diac for providing said secondary trigger signal when said control voltage amplitude reaches said predetermined level.

* * * * *